US009736739B2

(12) United States Patent
Melin et al.

(10) Patent No.: US 9,736,739 B2
(45) Date of Patent: Aug. 15, 2017

(54) MOVEMENT OF USER EQUIPMENTS BETWEEN CELLS (71) Applicant: Telefonaktiebolaget L M Ericsson (publ), Stockholm (SE)

(72) Inventors: Lena Melin, Vaxholm (SE); Håkan Axelsson, Linköping (SE); Rasmus Axén, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/439,277

(22) PCT Filed: Aug. 13, 2013

(86) PCT No.: PCT/SE2013/050968
§ 371 (c)(1),
(2) Date: Apr. 29, 2015

(87) PCT Pub. No.: WO2014/074047
PCT Pub. Date: May 15, 2014

(65) Prior Publication Data
US 2015/0282018 A1 Oct. 1, 2015

Related U.S. Application Data (60) Provisional application No. 61/724,365, filed on Nov. 9, 2012.

(51) Int. Cl.
*H04W 36/00* (2009.01)
(52) U.S. Cl.
CPC ... *H04W 36/0055* (2013.01); *H04W 36/0066* (2013.01)

(58) Field of Classification Search
CPC .................................................. H04W 36/00
USPC ................................................ 455/436–456
See application file for complete search history.

(56) References Cited

U.S. PATENT DOCUMENTS

| 8,666,415 B2* | 3/2014 | Wu ................... H04W 36/0022 370/328 |
| 9,313,720 B2* | 4/2016 | Balasubramanian . H04W 48/16 |
| 2011/0244858 A1 | 10/2011 | Callender |
| 2012/0069732 A1 | 3/2012 | Xu et al. |

(Continued)

FOREIGN PATENT DOCUMENTS

| WO | WO 2008/133566 | 11/2008 |
| WO | WO 2012/107647 | 8/2012 |

OTHER PUBLICATIONS

International Search Report for International application No. PCT/SE2013/050968, Mar. 20, 2014.

(Continued)

*Primary Examiner* — Michael T Vu
(74) *Attorney, Agent, or Firm* — Baker Botts, LLP (57) ABSTRACT A procedure is disclosed where a user equipment (UE) 10 can share information (with e.g. radio access network (RAN) nodes 20, 30) about its cell mobility attempts (e.g. redirection successes/failures). This information can subsequently be utilized by the various RAN nodes 20, 30 when making subsequent, i.e. future, cell mobility decisions. Hereby it is made possible to improve cell mobility decisions, such as redirection or handover, by the various RAN nodes 20, 30.

22 Claims, 5 Drawing Sheets (56) References Cited

U.S. PATENT DOCUMENTS

2012/0083245 A1* 4/2012 Adjakple ............... H04W 4/08
455/411
2012/0264417 A1* 10/2012 Gao ................. H04W 36/0083
455/422.1
2013/0077515 A1* 3/2013 Jung ..................... H04W 48/20
370/252

OTHER PUBLICATIONS

PCT Written Opinion of the International Searching Authority for the International application No. PCT/SE2013/050968, Mar. 20, 2014.
3GPP TSG RAN WG3 Meeting #76; Prague, Czech Republic; Title: Discussions on mobility configuration storage (R3-121109), May 21-25, 2012.
3GPP TSG-RAN WG3 Meeting #70; Jacksonville (FL), USA; Title: IRAT too late (R3-103270), Nov. 15-19, 2010.
A User Mobility Analysis Assistive MRO Algorithm for Handover Parameters Optimization in LTE SON System by Heng Zhang, 2012.
ETSI TS 136 331 V10.3.0; LTE; Evolved Universal Terrestrial Radio Access (E-UTRA); Radio Resource Control (RRC); Protocol specification (3GPP TS 36.311 version 10.3.0 Release 10), Nov. 2011.
ETSI TS 144 060 V10.6.0; Digital cellular telecommunications system (Phase 2+); General Packet Radio Service (GPRS); Mobile Station (MS)—Base Station System (BSS) interface; Radio Link Control/Medium Access Control (RLC/MAC) protocol (3GPP TS 44.060 version 10.6.0 Release 10), Oct. 2011.
3GPP TS 25.331 V12.5.0; 3rd Generation Partnership Project; Technical Specification Group Radio Access Network; Radio Resource Control (RRC); Protocol specification (Release 12), Mar. 2015.
Catt, "*UE measurements and logs for Mobility Robustness Optimisation*", Agenda Item 10.3, Discussion and Decision, 3GPP TSG-RAN WG3 Meeting #63bis, R3-090912, Seoul, Korea, Mar. 23-26, 2009, 3 pages.
Ericsson, "*Analisys and description of a solution for HetNet MRO*", Agenda Item 11.2, Discussion, Approval, 3GPP TSG-RAN WG3 Meeting #76, R3-121297, Prague, Czech Republic, May 21-25, 2012, 5 pages.
European Patent Office, Communication, Supplementary European Search Report, Application No./Patent No. 13853081.1-1854/2918092, transmitted to Baker Botts on Apr. 21, 2016, 5 pages.
European Patent Office, Communication Pursuant to Article 94(3) EPC, First Communication Report, Application No. 13 853 081.1-1854, 11 pages, Jun. 5, 2016.

* cited by examiner

MOVEMENT OF USER EQUIPMENTS BETWEEN CELLS

PRIORITY

This nonprovisional application is a U.S. National Stage Filing under 35 U.S.C. §371 of International Patent Application Ser. No. PCT/SE2013/050968, filed Aug. 13, 2013, and entitled "Movement of User Equipments Between Cells" which claims priority to U.S. Provisional Patent Application No. 61/724,365 filed Nov. 9, 2012, both of which are hereby incorporated by reference in their entirety.

TECHNICAL FIELD

Embodiments of the technology presented herein generally relate to communication networks and, more particularly, to movements (e.g. redirection or handover) of user equipments between cells.

BACKGROUND

This section is intended to provide a background to the various embodiments that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section In a typical cellular radio system, user equipments (UEs) (also known mobile terminals, terminals, user terminals, wireless terminals, wireless communication devices, wireless transmit/receive units (WTRUs)) can communicate via a radio access network (RAN) to one or more core networks (CN). The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

In some versions of the radio access network, several base stations are typically connected to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using e.g. wideband code division multiple access (WCDMA) for UEs. In a forum known as the Third Generation Partnership Project (3GPP), telecommunications suppliers propose and agree upon standards for third generation networks and UTRAN specifically, and investigate e.g. enhanced data rate and radio capacity. The 3GPP has developed specifications for the Evolved Universal Terrestrial Radio Access Network (E-UTRAN). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

Movement of UEs Between Cells

Session Continuity is a concept for using the so-called Release with Redirect mechanism and a method to move a UE between cells in a network while in the so-called connected mode. The cells may exist for the same radio access technology (RAT) or for different RATs. Release with Re-direct is a standardized (3GPP) procedure to perform such a move within a RAT or between RATs.

The mobility mechanism 'redirection' has existed for a number of years in the 3GPP standardization and can be seen as a complement to the traditional idle mode cell reselection mechanism and the network triggered handover mechanism. Redirection moves a UE rapidly to another frequency and/or RAT in order to retain service, for example when the UE is moving outside radio coverage. Redirection is also specified as one of the methods utilized by the so-called CSFB features (Circuit Switched Fallback).

The basic concepts for redirection can be summarized as follows: Redirection is generally network triggered—as is also the principle in the earlier-mentioned mechanism for handover. When using Redirection the UE is generally not directed to a specific cell, and no resources are reserved beforehand. This means that the source network (or, rather, the source RAN node) leaves it up to the UE to find the best cell and to continue the service there—i.e. similar to the principle behind cell reselection. The network (or, rather, a RAN node) can trigger a redirection based on, e.g, radio coverage reported by the UE after certain UE measurements. Alternatively, the network can trigger the redirection based on statically configured frequency neighbor relations.

With some of the current technologies, when a UE is moved from one (source) cell controlled by a (source) RAN node to another (target) cell in a (target) RAN node (e.g., according to the same RAT or different RATs) the target RAN node does not generally know from where the UE is moved. Moreover, the source RAN node does not generally know exactly to which target RAN node the UE is moved to. This is, for example, true when a so-called Release with Re-direct procedure is used.

This may give rise to a number of challenges for the network:

Observability of success rate of the move is generally not possible since the success rate is number of successful attempts divided by number of attempts and the number of attempts may only be counted in the source RAN node whereas the number of successful attempts may only be counted in the target RAN node. Typically, observability counters or similar functionality are typically configured to count on a per cell relation basis. When the source RAN node does not know exactly to what cell the UE is moved, this source RAN node cannot count this per cell relation. Also, when the target RAN node does not know what cell the UE is moved from, the target RAN node can not count this per cell relation either.

Network optimization is generally not possible. A network and/or operator cannot optimize the conditions for UE moves between cells, since the network and/or operator does/do not generally know between what cells these moves are currently made.

Automatic network tuning is generally not possible.

More particularly, when the UE is re-directed by means of Release with Redirect, the UE will generally search for a target cell in a requested RAT and, if the UE finds a cell with good enough quality, it will attempt to access that cell. The principle in the existing standardized solution generally as follows: When an UE is accessing the selected cell this target cell cannot tell whether the UE is accessing this selected cell due to a network triggered redirection or if it is due to a UE triggered cell reselection. For example when a UE is re-directed in either direction LTE->UTRAN (i.e. from LTE to UTRAN) or UTRAN->LTE (i.e. from UTRAN to LTE) there is no information given to the target network (or, rather, a RAN node of the target network) that the UE was redirected. Without this information the target RAN node cannot, for example, avoid rejecting or redirecting the UE back to the source cell. Moreover, since there is no possibility to observe how successful the redirects are there is also no way for the network to improve the success rate. Further, no input for neither self-optimization (SON) mechanisms nor for manual tuning by network configuration is generally available.

Related 3GPP Specifications

The following sections of a non-exhaustive list of 3GPP technical specifications may be applicable to the technology disclosed herein as a technology background:

3GPP TS 25.331 V.11.3.0 (2012-September): Chapters 8.1.3 "RRC Connection Establishment" and 8.1.4"RRC Connection Release".

3GPP TS 25.413 V.11.1.0 (2012-September): Chapter 8.34 "Direct Information Transfer".

3GPP TS 36.331 V.11.1.0 (2012-September): Chapters 5.3.3 "RRC Connection Establishment", 5.3.8 "RRC Connection Release" and 6.2.2.Message definitions.

3GPP TS 36.413 V.11.1.0 (2012-September): Chapter 8.13 "eNB Direct Information Transfer".

SUMMARY

It is in view of the above considerations and others that the various embodiments of the technology disclosed herein have been made.

In one of its aspects the technology disclosed herein concerns a method performed by user equipment (UE). In an example embodiment, the method comprises transmitting a signal to a target radio access network node (target RAN node), the signal comprising at least one cell mobility parameter. The at least one mobility parameter may be associated with the UE.

The at least one cell mobility parameter may e.g. comprise i) a source cell identification (ID) allocated to the UE, ii) a source radio access technology (source-RAT) parameter, iii) a parameter indicating a reason for cell movement (or, cell change) from a source cell to another cell, iv) a parameter indicating one or several frequencies that the UE has been requested, by a source radio access network node (source RAN node), to search (e.g., prior to the cell change) and/or v) a parameter indicating which cell the UE has been requested, by a source radio access network node (source RAN node), to move to.

In an example embodiment, the method additionally comprises, prior to transmitting the signal comprising the at least one cell mobility parameter associated with the UE, retrieving the at least one cell mobility parameter. The retrieving of the at least one cell mobility parameter may comprise receiving the at least one cell mobility parameter from a source RAN node. In other words, the UE is capable of retrieving, or acquiring, the at least one cell mobility parameter before the UE transmits the signal comprising this at least one cell mobility parameter to the target RAN node.

I another of its example aspects, the technology disclosed herein concerns a method performed by a radio access network (RAN) node, e.g. a target RAN node. In an example embodiment, the method comprises receiving a signal from a user equipment (UE), the signal comprising at least one cell mobility parameter. The at least one cell mobility parameter may be associated with the UE.

The at least one cell mobility parameter may e.g. comprise i) a source cell identification (ID) allocated to the UE, ii) a source radio access technology (source-RAT) parameter, iii) a parameter indicating a reason for cell movement (or, cell change) from a source cell to another cell, iv) a parameter indicating one or several frequencies that the UE has been requested, by a source radio access network node (source RAN node), to search (e.g., prior to the cell change) and/or v) a parameter indicating which cell the UE has been requested, by a source radio access network node (source RAN node), to move to.

In one example embodiment, the method also comprises storing the received at least one cell mobility parameter. The method may optionally comprise controlling subsequent cell mobility decisions in dependence of the stored at least one cell mobility parameter. In other words, the at least one cell mobility parameter provided to the RAN node can be utilized by the RAN node to make future cell mobility decisions based on input from the UE.

In yet another aspect, the technology disclosed herein concerns a user equipment (UE). In an example embodiment, the UE comprises a transmitting module adapted to transmit a signal to a target radio access network node (target RAN node), the signal comprising at least one cell mobility parameter. The at least one mobility parameter may be associated with to the UE.

The at least one cell mobility parameter may e.g. comprise i) a source cell identification (ID) allocated to the UE, ii) a source radio access technology (source-RAT) parameter, iii) a parameter indicating a reason for cell movement (or, cell change) from a source cell to another cell, iv) a parameter indicating one or several frequencies that the UE has been requested, by a source radio access network node (source RAN node), to search (e.g. prior to the cell change) and/or v) a parameter indicating which cell the UE has been requested, by a source radio access network node (source RAN node), to move to.

The UE may additionally comprise a retrieval module configured to retrieve the at least one cell mobility parameter, for example, prior to the transmitting module is transmitting the signal comprising the at least one cell mobility parameter associated with to the UE.

Additionally, or alternatively, the UE may comprise a receiving module configured to receive the at least one cell mobility parameter from a source RAN node.

I another of its example aspect, the technology disclosed herein a radio access network node (RAN node). In one example embodiment, the RAN node comprises a receiving module configured to receive a signal from a user equipment (UE), the signal comprising at least one cell mobility parameter. The at least one mobility parameter may be associated with the UE.

The at least one cell mobility parameter may e.g. comprise i) a source cell identification (ID) allocated to the UE, ii) a source radio access technology (source-RAT) parameter, iii) a parameter indicating a reason for cell movement (or, cell change) from a source cell to another cell, iv) a parameter indicating one or several frequencies that the UE has been requested, by a source radio access network node (source RAN node), to search (e.g. prior to the cell change) and/or v) a parameter indicating which cell the UE has been requested, by a source radio access network node (source RAN node), to move to.

In one example embodiment, the RAN node additionally comprises a storage module, such as a memory, configured to store a received at least one cell mobility parameter.

In one example embodiment, the RAN node additionally comprises a controlling module (e.g. embodied as a processor or processing circuitry) configured to control subsequent cell mobility decisions in dependence of the at least one cell mobility parameter.

The various embodiments described herein may provide several advantages. For example, various embodiments may allow for a UE to share information (with RAN nodes) about its cell mobility attempts (e.g. redirection successes/failures). This knowledge can subsequently be utilized by the various RAN nodes when making future cell mobility decisions. This may improve the cell mobility decisions made by RAN nodes. More particularly, source networks (or rather, source RAN nodes) and target networks (or rather, target RAN nodes) can make use of this input to improve, or optimize, its cell mobility decisions.

BRIEF DESCRIPTION OF THE DRAWINGS

These and other aspects, features and advantages of the technology will be apparent and elucidated from the following description of embodiments of the technology, reference being made to the accompanying drawings, in which.

DETAILED DESCRIPTION

The technology will now be described more fully hereinafter with reference to the accompanying drawings, in which certain embodiments of the technology are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

Figure 1:
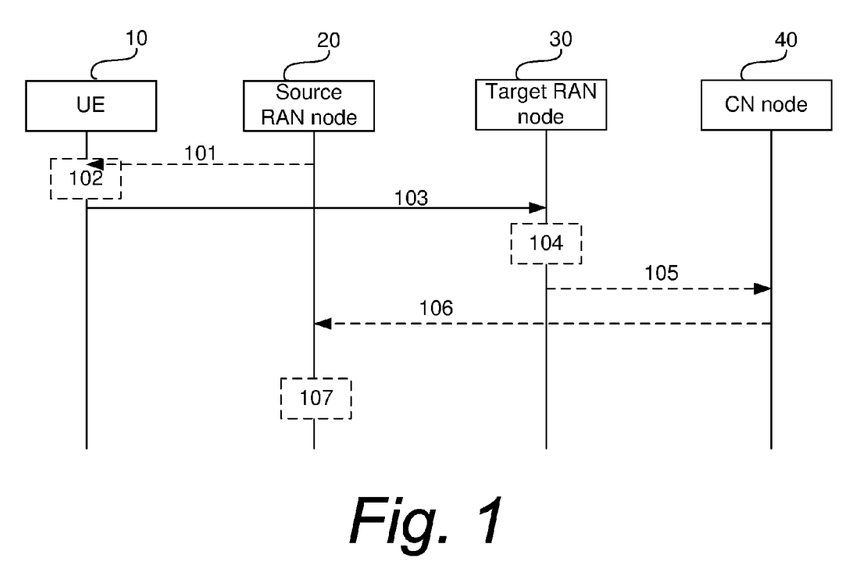
FIG. 1 illustrates a signaling diagram, or flowchart, of an embodiment of the technology disclosed herein.

A first embodiment will now be described with reference to FIG. 1 together with FIGS. 6, 7, 8 and 9, respectively. FIG. 1 illustrates a signaling diagram, or flowchart, of an exemplary method according one aspect. In this example, a UE 10, a source RAN node 20 and a target RAN node 30 are involved. The source RAN node 20 and the target RAN node 30 may be according to the same RAT or according to different RATs. In other words, the source RAN node 20 and the target RAN node 30 may be configured to operate using the same RAT or using different RATs. A core network (CN) node 40 may also be involved. The CN node 40 may then be used to transfer information between the target RAN node 30 and the source RAN node 20.

According to the example procedure of FIG. 1, the UE 10 transmits 103 a signal to the target RAN node 30. This signal which is transmitted 101 to the target RAN node 30 comprises at least one cell mobility parameter. As used herein, the term cell mobility parameter is generally used to mean a parameter which relates to or is otherwise relevant (or, important) for cell mobility, i.e. mobility of the UE between cells. To this end, the term cell mobility parameter may include any one of or a combination of two or more of the following:

1. a source cell identification (ID) allocated to the UE;
2. a source radio access technology (source-RAT) parameter, i.e. a parameter indicating the RAT to which the source RAN node (controlling the UE) belongs to;
3. a parameter indicating a reason for cell movement (or, cell change) from a source cell to another cell;
4. a parameter indicating one or several frequencies that the UE has been requested to search (e.g. by the source RAN node 20); and,
5. a parameter indicating which cell the UE has been requested to move to (e.g., by the source RAN node 20).

Prior to transmitting 103 the signal to the target RAN node 30, the UE 10 may retrieve (or, acquire) 102 the earlier-mentioned cell mobility parameter. The retrieval 102 of the cell mobility parameter may, in some embodiments, comprise receiving 101 the cell mobility parameter from, e.g., the source RAN node 20.

The target RAN node 30 receives 103 the signal including the cell mobility parameter. As will be appreciated, the target RAN node may accordingly be informed about, for instance, source cell (via e.g. the source cell ID parameter), the source RAT of the UE from which the signal was received (via e.g. the source RAT parameter) and/or the reason for the move (via e.g. the parameter indicating a reason for cell movement from a source cell to another cell). The reason for the move may e.g. indicate whether the UE is attempting access due to a network triggered re-direction or, alternatively, whether the UE is attempting access due to UE triggered cell reselection.

Advantageously, the target RAN node 30 stores the received cell mobility parameter. Thus, one or several received cell mobility parameters can be subsequently utilized 104 by the target RAN node to make future cell mobility decisions. In other words, subsequent cell mobility decisions, or cell movement decision (aka cell change decisions), can be controlled in dependence of the stored cell mobility parameters.

Optionally, the target RAN node can transmit 105 a signal including received cell mobility parameters to the CN node 40. This way, the target RAN node 30 shares the information embedded in the cell mobility parameters with the CN node.

Next, the CN node 40 may optionally transmit 106 the thus received cell mobility parameters to the source RAN node 20 and potentially to other additional RAN nodes. Accordingly, the source RAN node 20 may receive 106 the at least one cell mobility parameter. Advantageously, the source RAN node stores the thus received at least one cell mobility parameter. Similar to the target RAN node 40, the source RAN node 20 may store the received cell mobility parameter. Thus, one or several received cell mobility parameters can be subsequently utilized 107 by the source RAN node to make future cell mobility decisions. In other words, subsequent cell mobility decisions, or cell movement decision, can be controlled in dependence of the stored cell mobility parameters.

This example procedure can provide for a method for a UE to share information (with RAN nodes) about its cell mobility attempts (e.g. redirection successes/failures). This knowledge can then be utilized by the various RAN nodes when making subsequent, i.e. future, cell mobility decisions. So, both source networks and target networks can make use of this input to improve, or optimize, cell mobility decisions.

Figure 2:
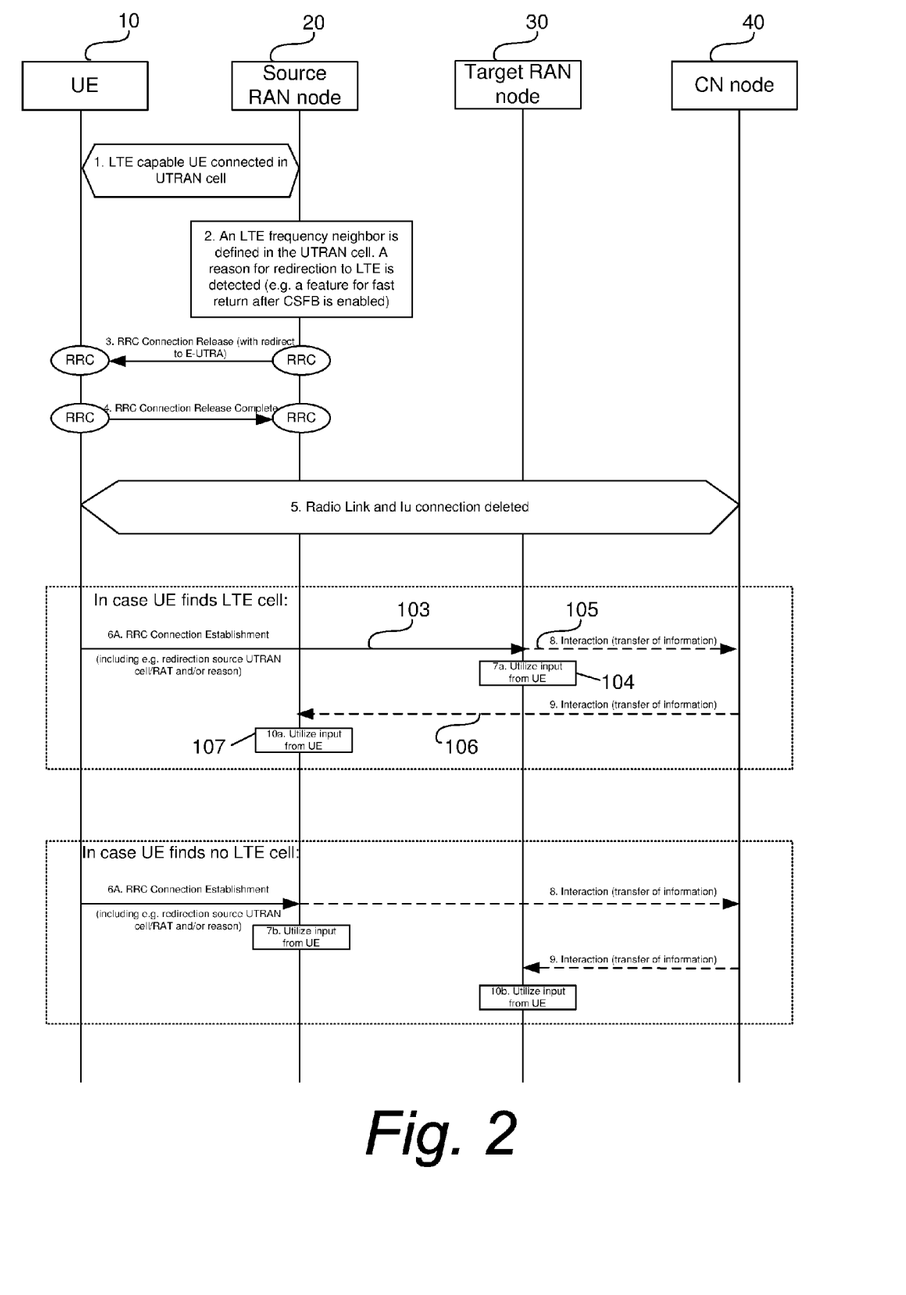
FIG. 2 illustrates a signaling diagram, or flowchart, of a more detailed embodiment of the technology disclosed herein.

Another embodiment will now be described with reference to FIG. 2. FIG. 2 illustrates a signaling diagram, or flowchart, of an exemplary method according another aspect. This example aspect concerns a so-called inter-RAT redirection, e.g. from WCDMA to LTE. As illustrated, a UE 10, a source RAN node 20 and a target RAN node 30 are involved. A core network (CN) node 40 may also be involved. The CN node 40 may then be used to transfer information between the source RAN node 20 and the target RAN node 30.

According to this example procedure, the UE is initially a LTE capable UE connected in an UTRAN cell (see step 1 in FIG. 2). The source RAN node 20 finds, or detects, a reason for redirection to a LTE cell (see step 2 in FIG. 2). Next, a RRC Connection Release procedure follows (see steps 3 through 5 in FIG. 2). During the RRC Connection Release procedure the source RAN node 20 transmits information about frequencies to the UE 10. The information about frequencies may, e.g., be provided as a list of frequencies. Also, the various resources are released. The steps 1 through 5 in FIG. 2 can be performed in accordance with existing standardized procedures and these steps will therefore not be further detailed herein, so as not to obscure the description herein with unnecessary detail.

Two scenarios will now be described. In a first scenario, the UE 10 finds a LTE cell. The UE 10 makes a cell selection from a list of frequencies and the UE can access a target cell controlled by the target RAN node 30. As an example, see step 6A in FIG. 2. Here, the UE transmits 103 a signal to the target RAN node 20, wherein the signal comprises at least one cell mobility parameter. As mentioned hereinabove, the at least one cell mobility parameter may e.g. comprise i) a source cell ID, ii) a source-RAT parameter, iii) a parameter indicating a reason for cell movement (or, cell change) from a source cell to another (i.e., target) cell, iv) a parameter indicating one or several frequencies that the UE has been requested, by a source RAN node, to search and/or v) a parameter indicating which cell the UE has been requested, by a source RAN node, to move to.

The target RAN node 30 receives 103 the signal including the above-mentioned cell mobility parameter. The target RAN node may consequently be informed about, for instance, source cell, the source RAT and/or the reason for the move (e.g. cell change). Advantageously, the target RAN node 30 stores the received cell mobility parameter. Thus, one or several received cell mobility parameters can be subsequently utilized 104 by the target RAN node to make future cell mobility decisions (see step 7a in FIG. 2). In other words, subsequent cell mobility decisions, or cell movement decision, can be controlled in dependence of the stored cell mobility parameters.

Optionally, the target RAN node 30 can transmit 105 a signal including received cell mobility parameters to the CN node 40 (see step 8 in FIG. 2). This way, the target RAN node 30 shares the cell mobility parameters with the CN node 40. Next, the CN node 40 may optionally transmit 106 the thus received cell mobility parameters to the source RAN node 20 and potentially to other additional RAN nodes (see step 9 in FIG. 2). Accordingly, the source RAN node 20 thus receives 106 the at least one cell mobility parameter. The source RAN node 20 can store the thus received at least one cell mobility parameter. Thus, one or several received cell mobility parameters can be subsequently utilized 107 by the source RAN node to make future cell mobility decisions (see step 10a in FIG. 2). In other words, subsequent cell mobility decisions, or cell movement decision (aka cell change decisions), can be controlled in dependence of the stored cell mobility parameters.

In a second scenario, the UE does not find any LTE cell. In this scenario, the procedure differs in that the UE 10 is transmitting the signal comprising the at least one cell mobility parameter to the source RAN node 20 (instead of target RAN node 30). The source RAN node can store the thus received at least one cell mobility parameter and stored cell mobility parameters can be subsequently utilized 107 by the source RAN node when making future cell mobility decisions (see step 7b in FIG. 2). Also, the source RAN node 20 may optionally transmit a signal including received cell mobility parameters to the CN node 40 (see step 8 in FIG. 2). This way, the source RAN node 20 shares the cell mobility parameters with the CN node 40. Next, the CN node 40 may optionally transmit the thus received cell mobility parameter(s) to the target RAN node 30 and potentially to other additional RAN nodes (see step 9 in FIG. 2). The target RAN node 30 can store the thus received at least one cell mobility parameter and the stored cell mobility parameters can be subsequently utilized by the target RAN node when making future cell mobility decisions (see step 7b in FIG. 2).

This example procedure provides for a method for a UE to share information (with RAN nodes) about its cell mobility attempts (e.g. redirection successes/failures). This knowledge can then be utilized by the various RAN nodes when making subsequent, i.e. future, cell mobility decisions. So, both source networks and target networks can make us of this input to improve, or optimize, cell mobility decisions.

Figures 3, 4:
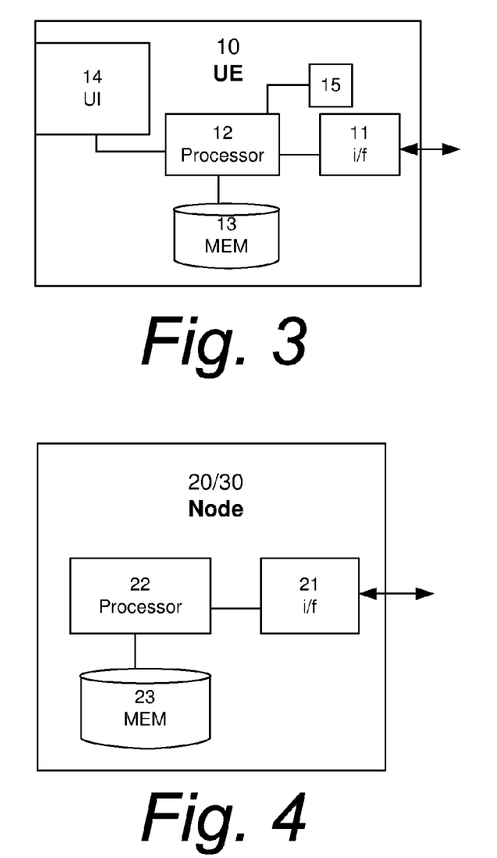
FIG. 3 illustrates an example embodiment of a UE.
FIG. 4 illustrates an example embodiment of a RAN node.
Figure 5:
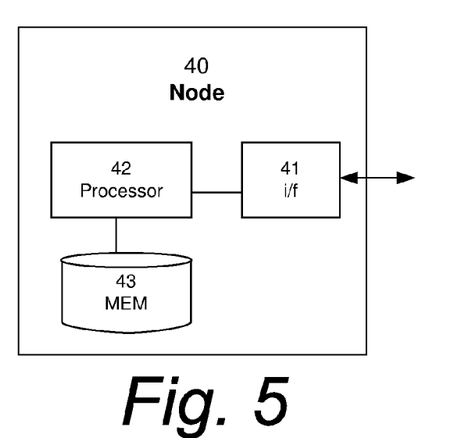
FIG. 5 illustrates an example embodiment of CN node.
Figure 6:
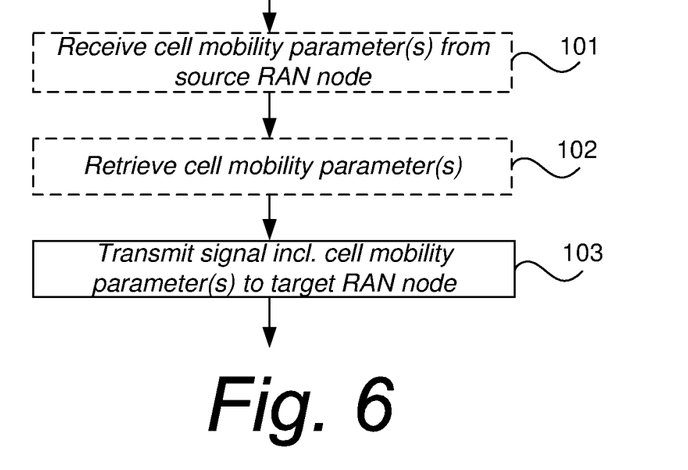
FIG. 6 illustrates a flowchart of an example method performed by the UE in FIG. 1.
Figure 7:
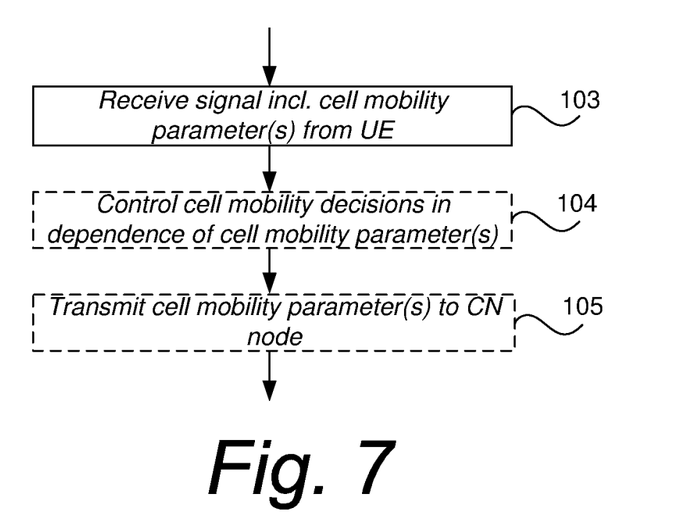
FIG. 7 illustrates a flowchart of an example method performed by the target RAN node in FIG. 1.
Figure 8:
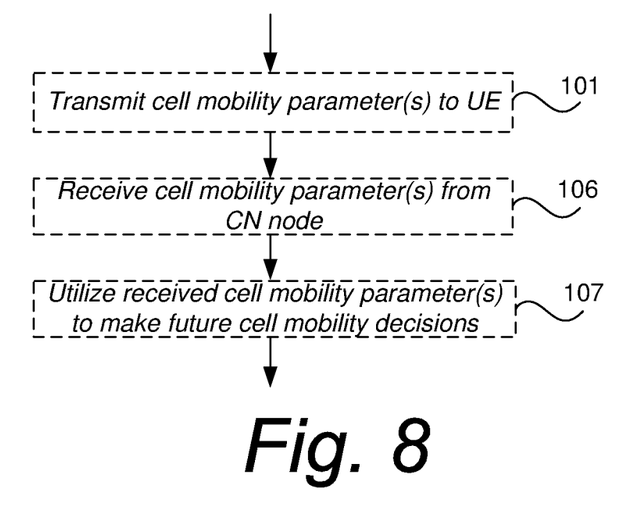
FIG. 8 illustrates a flowchart of an example method performed by source RAN node in FIG. 1.
Figure 9:
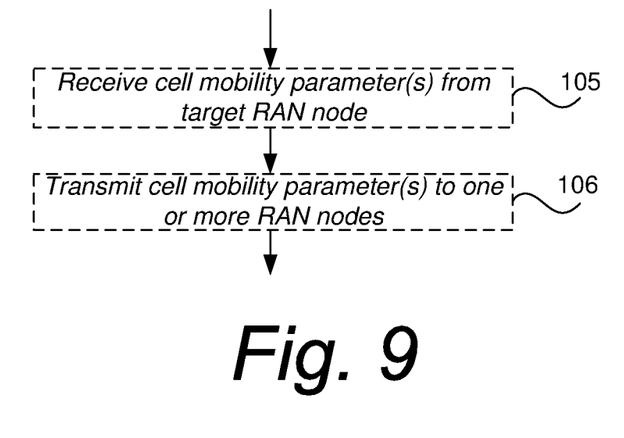
FIG. 9 illustrates a flowchart of an example method performed by CN node in FIG. 1.

FIG. 3 illustrates exemplary user equipment (UE) 10. The UE 10 is configured to execute the method shown in FIG. 6. To this end, the UE 10 may comprise an interface module 11, a controlling module 12 (e.g. a processor), and a storage module 13 (e.g. a memory). Optionally, the UE 10 may also comprise a user interface 14 through which a user can operate and interact with the UE 10. The interface module 11 may comprise a transmitting module (Tx), a receiving module (Rx) or both. In some embodiments, the transmitting module (Tx) and the receiving module (Rx) may be embodied in a single transceiver module.

In an example embodiment, the transmitting module is configured to transmit a signal to a target radio access network node (target RAN node), the signal comprising at least one cell mobility parameter associated with the UE. The at least one cell mobility parameter may comprise one or more of the following: a source cell ID, a source-RAT parameter, a parameter indicating a reason for cell movement (or, cell change) from a source cell to another cell, a parameter indicating one or several frequencies that the UE has been requested to search and/or a parameter indicating which cell the UE has been requested to move to.

A retrieval module 15 may also be provided. This can be embodied as a separate component as shown in FIG. 3 or, alternatively, as part of the controlling module 12. The retrieval module 15 may be configured to retrieve the at least one cell mobility parameter, for example, before the transmitting module 11 transmits a signal including the at least one cell mobility parameter.

In some embodiments, the one or more cell mobility parameter(s) can be retrieved from external sources such as other RAN nodes. For example, the receiving module 11 may be configured to receive the cell mobility parameter(s) from a RAN node, such as a source RAN node.

FIG. 4 illustrates exemplary node 20/30. The node 20/30 may be referred to as a RAN node. As such, the RAN node can be either a source RAN node 20 or a target RAN node 30. The node 20/30 is configured to execute the method shown in FIG. 7, or the method shown in FIG. 8, or both the method shown in FIG. 7 and the method shown in FIG. 8.

To this end, the node 20/30 may comprise an interface module 21, a controlling module 22 (e.g. a processor), and a storage module 23 (e.g. a memory). The interface module 21 may comprise a transmitting module (Tx), a receiving module (Rx) or both. In some embodiments, the transmitting module (Tx) and the receiving module (Rx) may be embodied in a single transceiver module.

In an example embodiment, the receiving module 21 is configured to receive a signal from a UE, the signal comprising at least one cell mobility parameter associated with to the UE. The at least one cell mobility parameter may comprise one or more of the following: a source cell ID, a source-RAT parameter, a parameter indicating a reason for cell movement from a source cell to another cell, a parameter indicating one or several frequencies that the UE has been requested to search and/or a parameter indicating which cell the UE has been requested to move to. Also, the storage module 23 may be configured to store the received cell mobility parameter(s). Yet further, the controlling module 22 may be configured to control subsequent cell mobility decisions based on information from earlier-received, and thus stored, cell mobility parameter(s).

FIG. 4 illustrates an exemplary node 40, which may be referred to as a CN node. The node 40 is configured to execute the method shown in FIG. 9. To this end, the node 40 may comprise an interface module 41, a controlling module 42 (e.g. a processor), and a storage module 43 (e.g. a memory). The interface module 41 may comprise a transmitting module (Tx), a receiving module (Rx) or both. In some embodiments, the transmitting module (Tx) and the receiving module (Rx) may be embodied in a single transceiver module.

In an example embodiment, the receiving module 41 may be configured to receive a signal from another node (e.g. from a RAN node such as the target RAN node 30), the signal comprising one or several cell mobility parameter(s). Also, the storage module 43 may be configured to store the received cell mobility parameter(s). Yet further, a transmitting module 41 may be configured to transmit, e.g. broadcast, a signal comprising earlier-received cell mobility parameter(s) to other nodes, such as the source RAN node 20.

Various embodiments of the technology disclosed herein provide for a UE that can share cell mobility parameter(s) with RAN nodes. This shared information can relate to cell mobility attempts of the UEs (e.g. redirection successes/failures). This information (and, thus, knowledge) can subsequently be utilized by the various RAN nodes when making cell mobility decisions, e.g. redirection or handover decisions. This way, source networks and/or target networks can make us of this input from UEs to improve, or optimize, cell mobility decisions (e.g. redirection or handover decisions).

In turn, this may result in improved observability in networks. As a mere example, when a UE is redirected to a RAN where it finds no available cell, it could return to the source RAN (or possible another RAN). If the UE then reports the unsuccessful redirection to the RAN where it establishes its radio connection, this RAN could e.g. inhibit repetitive redirections to the same target RAN for a certain period in time or from a UE in a certain geographical area, etcetera. The various embodiments of technology may also enable optimization of the networks. Assume that statistics show that a certain UE redirected from cell x in RAN A, to a RAN B with a frequency list containing frequency: i, ii, and iii, always ends up connected to frequency iii, in RAN B. Using this type of statistics knowledge, the source RAN might optimize the redirection decisions accordingly (more or less automatically). This may as a result decrease "out-of-reach time" for UEs, since the UEs does not have to search for frequencies where there is little probability to find radio coverage.

Related 3GPP Specifications

The following sections of a non-exhaustive list of 3GPP technical specifications may be impacted, or otherwise improved, by the various embodiments of technology described herein:

- 3GPP TS 25.331 V.11.3.0 (2012-September): Chapters 8.1.3 "RRC Connection Establishment", 8.1.4. "RRC Connection Release", and 8.5.2 "Actions when entering idle mode from connected mode".
- 3GPP TS 25.413 V.11.1.0 (2012-September)I: Chapter 8.34 "Direct Information Transfer".
- 3GPP TS 36.331 V.11.1.0 (2012-September): Chapters 5.3.3 "RRC Connection Establishment", 5.3.8 "RRC Connection Release", 6.2.2. "Message definitions" and 6.3.4 "Mobility Control Information Elements".
- 3GPP TS 36.413 V.11.1.0 (2012-September): Chapter 8.13 "eNB Direct Information Transfer".

In the detailed description hereinabove, for purposes of explanation and not limitation, specific details are set forth such as particular architectures, interfaces, techniques, etc. in order to provide a thorough understanding of various embodiments of the present technology. In some instances, detailed descriptions of well-known devices, circuits, components, modules and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks or modules are to be understood as being either hardware-implemented and/or computer-implemented, and thus machine-implemented. In terms of hardware implementation, the functional blocks or modules may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Selected Example Embodiments

The technology disclosed herein thus encompasses without limitation the following non-limiting example embodiments:

Example Embodiment M1: A method performed by user equipment (UE), comprising: transmitting a signal to a target radio access network node (target RAN node), the signal comprising at least one cell mobility parameter associated with the UE.

Example Embodiment M2: The method of example M1, wherein the at least one cell mobility parameter comprises a source cell identification (ID) allocated to the UE.

Example Embodiment M3: The method of example M1 or M2, wherein the at least one cell mobility parameter comprises a source radio access technology (source-RAT) parameter.

Example Embodiment M4: The method of any of the examples M1-M3, wherein the at least one cell mobility parameter comprises a parameter indicating a reason for cell movement from a source cell to another cell.

Example Embodiment M5: The method of any of the examples M1-M4, wherein the at least one cell mobility parameter comprises: a parameter indicating one or several frequencies that the UE has been requested, by a source radio access network node (source RAN node), to search.

Example Embodiment M6: The method of any of the examples M1-M5, wherein the at least one cell mobility parameter comprises: a parameter indicating which cell the UE has been requested, by a source radio access network node (source RAN node), to move to.

Example Embodiment M7: The method of any of the examples M1-M6, comprising, for example, prior to transmitting the signal comprising the at least one cell mobility parameter associated with the UE, retrieving the at least one cell mobility parameter.

Example Embodiment M8: The method of example M7, wherein the retrieving of the at least one cell mobility parameter comprises receiving the at least one cell mobility parameter from a source RAN node.

Example Embodiment M9: A method performed by a target radio access network node (target RAN node), comprising: receiving a signal from a user equipment (UE), the signal comprising at least one cell mobility parameter associated with the UE.

Example Embodiment M10: The method of example M9, wherein the at least one cell mobility parameter comprises a source cell identification (ID) allocated to the UE.

Example Embodiment M11: The method of example M9 or M10, wherein the at least one cell mobility parameter comprises a source radio access technology (source-RAT) parameter.

Example Embodiment M12: The method of any of the examples M9-M11, wherein the at least one cell mobility parameter comprises a parameter indicating a reason for cell movement from a source cell to another cell.

Example Embodiment M13: The method of any of the examples M9-M12, wherein the at least one cell mobility parameter comprises: a parameter indicating one or several frequencies that the UE has been requested, by a source radio access network node (source RAN node), to search.

Example Embodiment M14: The method of any of the examples M9-M13, wherein the at least one cell mobility parameter comprises: a parameter indicating which cell the UE has been requested, by a source radio access network node (source RAN node), to move to.

Example Embodiment M15: The method of any of the examples M9-M14, comprising: storing the received at least one cell mobility parameter and controlling subsequent cell mobility decisions in dependence of the stored at least one cell mobility parameter.

Example Embodiment U1: A user equipment (UE), comprising: a transmitting module adapted to transmit a signal to a target radio access network node (target RAN node), the signal comprising at least one cell mobility parameter associated with the UE.

Example Embodiment U2: The UE of example U1, wherein the at least one cell mobility parameter comprises a source cell identification (ID) allocated to the UE.

Example Embodiment U3: The UE of example U1 or U2, wherein the at least one cell mobility parameter comprises a source radio access technology (source-RAT) parameter.

Example Embodiment U4: The UE of any of the examples U1-U3, wherein the at least one cell mobility parameter comprises a parameter indicating a reason for cell movement from a source cell to another cell.

Example Embodiment U5: The UE of any of the examples U1-U4, wherein the at least one cell mobility parameter comprises: a parameter indicating one or several frequencies that the UE has been requested, by a source radio access network node (source RAN node), to search.

Example Embodiment U6: The UE of any of the examples U1-U5, wherein the at least one cell mobility parameter comprises: a parameter indicating which cell the UE has been requested, by a source radio access network node (source RAN node), to move to.

Example Embodiment U7: The UE of any of the examples U1-U6, comprising: a retrieval module configured to retrieve the at least one cell mobility parameter, e.g., prior to the transmitting module is transmitting the signal comprising the at least one cell mobility parameter associated with the UE.

Example Embodiment U8: The UE of any of the examples U1-U6, comprising a receiving module configured to receive the at least one cell mobility parameter from a source RAN node.

Example Embodiment U9: The UE of example U8, wherein the retrieval module is configured to retrieve the least one cell mobility parameter from the receiver.

Example Embodiment N1: A radio access network node (RAN node), comprising: a receiving module configured to receive a signal from a user equipment (UE), the signal comprising at least one cell mobility parameter associated with the UE.

Example Embodiment N2: The RAN node of example N1, wherein the at least one cell mobility parameter comprises a source cell identification (ID) allocated to the UE.

Example Embodiment N3: The RAN node of example N1 or N2, wherein the at least one cell mobility parameter comprises a source radio access technology (source-RAT) parameter.

Example Embodiment N4: The RAN node of any of the examples N1-N3, wherein the at least one cell mobility parameter comprises a parameter indicating a reason for cell movement from a source cell to another cell.

Example Embodiment N5: The RAN node of any of the examples N1-N4, wherein the at least one cell mobility parameter comprises: a parameter indicating one or several frequencies that the UE has been requested, by a source radio access network node (source RAN node), to search.

Example Embodiment N6: The RAN node of any of the examples N1-N5, wherein the at least one cell mobility parameter comprises: a parameter indicating which cell the UE has been requested, by a source radio access network node (source RAN node), to move to.

Example Embodiment N7: The RAN node of any of the examples N1-N6, comprising: a storage module configured to store the received at least one cell mobility parameter.

Example Embodiment N8: The RAN node of example N7, comprising: a controlling module configured to control subsequent cell mobility decisions in dependence of the stored at least one cell mobility parameter.

Although the description above contains much specificity, these should not be construed as limiting the scope of the technology but as merely providing illustrations of some of the presently preferred embodiments. It will be appreciated that the scope of the technology disclosed herein fully encompasses other embodiments which may become obvious to those skilled in the art, and that the scope of the technology is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Consequently, although the present invention has been described above with reference to specific embodiments, it is not intended to be limited to the specific form set forth herein. The invention is limited only by the accompanying claims and other embodiments than the specific above are equally possible within the scope of the appended claims. Also, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Finally, reference signs in the claims are provided merely as a clarifying example and should not be construed as limiting the scope of the claims in any way.

The invention claimed is:

1. A method performed by a user equipment, UE, the method comprising:
   obtaining an indication that a UE connection should move from a source cell served by a source radio access node of a first type of radio access technology (RAT) to a second cell served by a target radio access node of a second type of RAT;
   acquiring, from the source radio access node of the first type of RAT, at least one cell mobility parameter associated with the UE, wherein the at least one cell mobility parameter comprises a parameter indicating a reason for cell movement from the source cell to the second cell;
   receiving, from the source radio access node, information about one or more frequencies, the information about one or more frequencies comprising a list of frequencies; and
   upon finding the second cell served by the target radio access node of the second type of RAT, transmitting a signal to the target radio access network node, the signal comprising the acquired at least one cell mobility parameter associated with the UE.

2. The method of claim 1, wherein the at least one cell mobility parameter comprises a source cell identification, ID, allocated to the UE.

3. The method of claim 1, wherein the at least one cell mobility parameter comprises a source radio access technology, RAT, parameter.

4. The method of claim 1, wherein the at least one cell mobility parameter comprises: a parameter indicating one or several frequencies that the UE has been requested, by the source radio access network node, to search.

5. The method of claim 1, wherein the at least one cell mobility parameter comprises: a parameter indicating which cell the UE has been requested, by the source radio access network node, to move to.

6. The method of claim 1, comprising:
   upon not finding the second cell served by the target radio access node of the second type of RAT, transmitting the signal comprising the at least one cell mobility parameter associated with the UE to the source radio access node.

7. A method performed by a target radio access network node, the method comprising:
   receiving a signal from a user equipment, UE, the signal comprising at least one cell mobility parameter associated with the UE, wherein the at least one cell mobility parameter comprises a parameter indicating a reason for cell movement from a source cell to another cell;
   storing the received at least one cell mobility parameter;
   controlling subsequent cell mobility decisions in dependence of the stored at least one cell mobility parameter; and
   transmitting, to a core network node, a signal including the received at least one cell mobility parameter associated with the UE.

8. The method of claim 7, wherein the at least one cell mobility parameter comprises a source cell identification, ID, allocated to the UE.

9. The method of claim 7, wherein the at least one cell mobility parameter comprises a source radio access technology, RAT, parameter.

10. The method of claim 7, wherein the at least one cell mobility parameter comprises: a parameter indicating one or several frequencies that the UE has been requested, by a source radio access network node, to search.

11. The method of claim 7, wherein the at least one cell mobility parameter comprises: a parameter indicating which cell the UE has been requested, by a source radio access network node, to move to.

12. A user equipment, UE, comprising:
a transmitter;
a receiver; and
one or more processors coupled to the transmitter and the receiver, the one or more processors configured to:
obtain an indication that a UE connection should move from a source cell served by a source radio access node of a first type of radio access technology (RAT) to a second cell served by a target radio access node of a second type of RAT;
acquire, from the source radio access node of the first type of RAT, at least one cell mobility parameter associated with the UE, wherein the at least one cell mobility parameter comprises a parameter indicating a reason for cell movement from the source cell to the second cell;
receive, from the source radio access node, information about one or more frequencies, the information about one or more frequencies comprising a list of frequencies; and
upon finding the second cell served by the target radio access node of the second type of RAT, transmit a signal to a target radio access network node, the signal comprising the acquired at least one cell mobility parameter associated with the UE.

13. The UE of claim 12, wherein the at least one cell mobility parameter comprises a source cell identification, ID, allocated to the UE.

14. The UE of claim 12, wherein the at least one cell mobility parameter comprises a source radio access technology, RAT, parameter.

15. The UE of claim 12, wherein the at least one cell mobility parameter comprises: a parameter indicating one or several frequencies that the UE has been requested, by the source radio access network node, to search.

16. The UE of claim 12, wherein the at least one cell mobility parameter comprises: a parameter indicating which cell the UE has been requested, by the source radio access network node, to move to.

17. The UE of claim 12, wherein the one or more processors are configured to:
upon not finding the second cell served by the target radio access node of the second type of RAT, transmit the signal comprising the at least one cell mobility parameter associated with the UE to the source radio access node.

18. A radio access network node comprising:
a transmitter;
a receiver;
a memory; and
one or more processors coupled to the transmitter, the receiver and the memory, the one or more processors configured to:
receive a signal from a user equipment, UE, the signal comprising at least one cell mobility parameter associated with the UE, wherein the at least one cell mobility parameter comprises a parameter indicating a reason for cell movement from a source cell to another cell;
store the received at least one cell mobility parameter;
control subsequent cell mobility decisions in dependence of the stored at least one cell mobility parameter; and
transmit, to a core network node, a signal including the received at least one cell mobility parameter associated with the UE.

19. The radio access network node of claim 18, wherein the at least one cell mobility parameter comprises a source cell identification, ID, allocated to the UE.

20. The radio access network node of claim 18, wherein the at least one cell mobility parameter comprises a source radio access technology, RAT, parameter.

21. The radio access network node of claim 18, wherein the at least one cell mobility parameter comprises: a parameter indicating one or several frequencies that the UE has been requested, by a source radio access network node, to search.

22. The radio access network node of claim 18, wherein the at least one cell mobility parameter comprises: a parameter indicating which cell the UE has been requested, by a source radio access network node, to move to.

* * * * *